United States Patent [19]
McCollum

[11] 3,767,160
[45] Oct. 23, 1973

[54] NULL-BALANCE REGULATOR VALVE

[76] Inventor: Robert F. McCollum, 6753 E. 32nd Pl., Tulsa, Okla. 74145

[22] Filed: Jan. 20, 1971

[21] Appl. No.: 108,027

[52] U.S. Cl............... 251/61, 251/61.3, 251/313, 92/98 D, 92/132
[51] Int. Cl..................... F16j 3/00, F16k 31/145
[58] Field of Search.................. 251/61, 61.2, 313, 251/61.3, 61.4, 62, 338, 326, 327; 92/98 D, 92/132, 94; 267/167

[56] References Cited
UNITED STATES PATENTS

| 927,446 | 6/1972 | Beebe | 251/61.2 |
|---|---|---|---|
| 1,824,046 | 9/1931 | Fitts | 251/338 X |
| 2,209,844 | 7/1940 | Otto | 251/61 |
| 3,043,338 | 7/1962 | Hanson | 92/132 X |
| 3,086,745 | 4/1963 | Natho | 251/62 |
| 2,192,703 | 3/1940 | Boller | 251/313 X |

FOREIGN PATENTS OR APPLICATIONS

| 1,247,388 | 10/1960 | France | 251/61.3 |

Primary Examiner—Arnold Rosenthal
Attorney—Head & Johnson

[57] ABSTRACT

A null-balance valve for regulating fluid flow having a valve body with a fluid passageway therethrough, a closure member in the body movable between an opened position and a closed position, a cylinder supported to the valve body having a first fluid port adjacent one end and a second fluid port adjacent the other, a rolling diaphragm and piston in the cylinder intermediate the ports, the piston being attached to the closure member for positioning the closure member in response to the force applied to the piston, the force being the difference in pressure between the first and second ports times the working area of the piston, and constant tension means normally urging the closure member towards either the opened or closed position.

1 Claim, 8 Drawing Figures

Patented Oct. 23, 1973

INVENTOR.
ROBERT F. McCOLLUM
BY
Head & Johnson
ATTORNEYS

Patented Oct. 23, 1973

INVENTOR.
ROBERT F. McCOLLUM
BY Head & Johnson
ATTORNEYS

# NULL-BALANCE REGULATOR VALVE

BACKGROUND, SUMMARY AND OBJECTS OF THE INVENTION

This invention is a regulating valve having many possible applications. A specific application is that of controlling air pressure in a tape transport. Many tape transports use air pressure to control column vacuum and air bearings as well as to force magnetic tape against or away from a rotating capstan as a means of advancing or stopping the movement of the tape.

This invention provides a valve for regulating the flow of a fluid, either liquid or gas, automatically in response to a hyrdaulic or pneumatic control signal. While regulator valves are generally well known most of such valves include a spring rate associated with the position of a control component. For this reason the required magnitude of the control signal changes between the opened and closed position. In contrast, this invention provides a regulator valve wherein there is no spring rate associated with the valve position. The valve is devoid of unbalanced forces when the preset control signal pressure is reached, regardless of whether the valve is in the opened or closed position, or any position therebetween. The invention is thus termed a "null-balance regulator valve."

In order to achieve a null-balance regulator valve three basic conditions must be satisfied:

A. The valve closure member which regulates the rate of flow through the valve must be insensitive to the controlled fluid flow parameters;

B. The control signal must be converted to a control force having a constant ratio; and C. The applied set point force must be constant at all positions of the valve closure member.

This invention provides a regulator valve which satisfies all of the above-mentioned requirements.

It is therefore an object of this invention to provide a null-balance regulator valve.

More particularly, an object of this invention is to provide a null-balance valve for regulating fluid flow wherein the closure member portion of the valve is insensitive to the controlled fluid flow parameters, wherein the control signal functions at a constant ratio to actuate the control valve, and wherein the applied set point force is constant, all of which results in a valve which is devoid of unbalanced forces when the preset control signal pressure is reached, regardless of whether the valve is opened, closed, or in some intermediate position.

These general objects, as well as more specific objects, will be fulfilled by the null-balance regulator valve disclosed in the following description and claims, taken in conjunction with the attached drawings.

DESCRIPTION OF THE VIEWS

DETAILED DESCRIPTION

Figure 1:
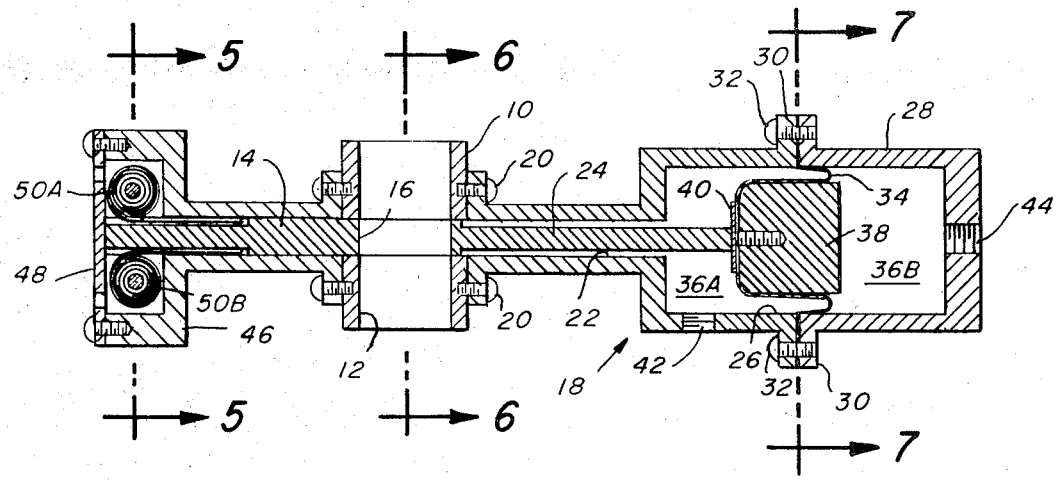
FIG. 1 is a cross-sectional view of an embodiment of a null-balance regulator control valve of this invention.

Referring first to FIG. 1, a valve body 10 is shown having a fluid passageway 12 therein. Slidably positioned in body 10 is a closure member 14 having an opening 16 therein which, when aligned with flow passageway 12 as shown in FIG. 1, permits fluid to flow freely through the valve. When the closure member is moved so that the opening 16 is not aligned with flow passageway 12, fluid flow through the valve is blocked.

Affixed to valve body 10 is a regulator body generally indicated by numeral 18. The regulator body 18 is supported to the valve body 10 such as by means of bolts 20. Regulator body 18 has a longitudinal opening 22 therein which receives a shaft 24 extending from closure member 14. The outer end of regulator body 18 forms a portion of a cylinder 26. The other portion of the cylinder 26 is formed by regulator second body portion 28. First and second body portions 18 and 28 are held together such as by means of flanged portions 30 and bolts 32. Clamped between the flanged portions 30 is a rolling diaphragm 34 which divides the interior of cylinder 26 into chambers 36A and 36B. In the cylinder 26 is a piston 38 which engages the diaphragm 34, the piston being affixed to shaft 24. A washer 40 between the shaft 24 and piston 38 serves to retain diaphragm 34.

Formed in the regulator body 18 is a first port opening 42 and in second body portion 28 is a second port opening 44.

Figure 5:
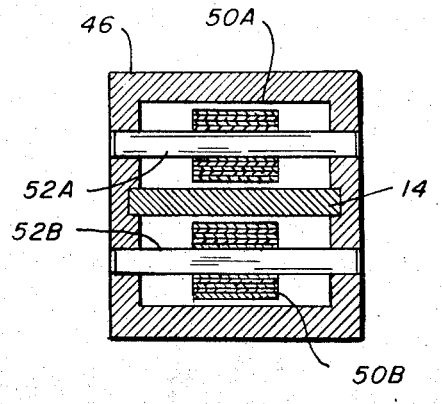
FIGS. 5, 6 and 7 are cross-sectional views taken along correspondingly numbered section lines of FIG. 1.

Affixed to valve body 10 opposite regulator body 18 is a spring housing 46 which is closed at its outer end by means of a plate 48. Positioned within the spring housing 46 is a first constant tension spring 50A and a second constant tension spring 50B. Springs 50A and 50B form a natural state coil about shafts 52A and 52B (see FIG. 5). The inactive end of spring 50A is attached to valve closure member 14 and the active end is coiled about shaft 52A. In like manner, the inactive end of spring 50B is attached to valve closure member 14 and the active end is coiled about shaft 52B.

The position of closure member 14 in valve body 10 is determined by four factors. First is the working area of the piston formed by piston portion 38 and rolling diaphragm 34. The characteristic of rolling diaphragm 34 is to provide a constant area. Second is the tension applied by springs 50A and 50B which is predetermined by design of the spring. In the illustrated arrangement of FIG. 1 the tension is utilized to move the closure member 14 towards the valve opened position. Third is the pressure applied through first port opening 42 which tends to overcome the pull of springs 50A and 50B and move the closure member 14 towards the closed position. Fourth, and last, is the pressure applied at second port opening 44. Total force exerted by the pressure applied at port openings 42 and 44 is determined by the difference in pressure at the ports multiplied by the working area of the piston formed by diaphragm 34. When the pressure at port 44 decreases below the pressure at port 42 to a level where the difference in pressure between the ports multiplied by the working area of diaphragm 34 equals a force exceeding the retraction force of springs 50A and 50B the valve closure member 14 will move to the right and decrease the flow area through the valve body 10. When the pressure of port 42 less the pressure of port 44, multiplied by the working area of diaphragm 34 is equal to the retraction force of springs 50A and 50B, the valve is in the null-balance condition and the closure member 14 will not move regardless of its position, that is, it will not tend to move whether the valve is opened, closed, or some intermediate position. When the pressure at port 42 minus the pressure at port 44 multiplied by the working area of diaphragm 34 is less than the retraction force of springs 50A and 50B, the closure member 14 will move to the left and increase the net flow area through the valve body.

Thus, the null-balance condition is achieved by forces completely independent of the rate of flow of fluid through the valve 10, and the null-balance condition is determined only by the difference in pressure between ports 42 and 44. When this established differential pressure exists the valve is in the null-balanced condition and will remain in such condition irrespective of any changes in parameters of the fluid flow through the valve body 10.

Figure 6:
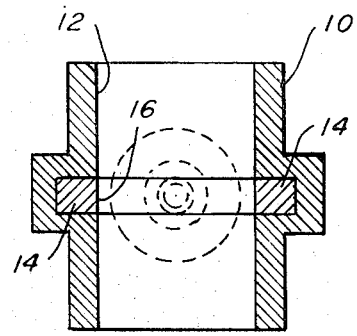
Figure 7:
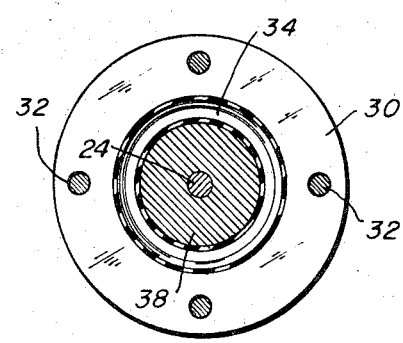

FIGS. 6 and 7 show cross-sectional views of FIG. 1 to further illustrate an exemplary embodiment of the null-balance regulator valve.

Figure 2:
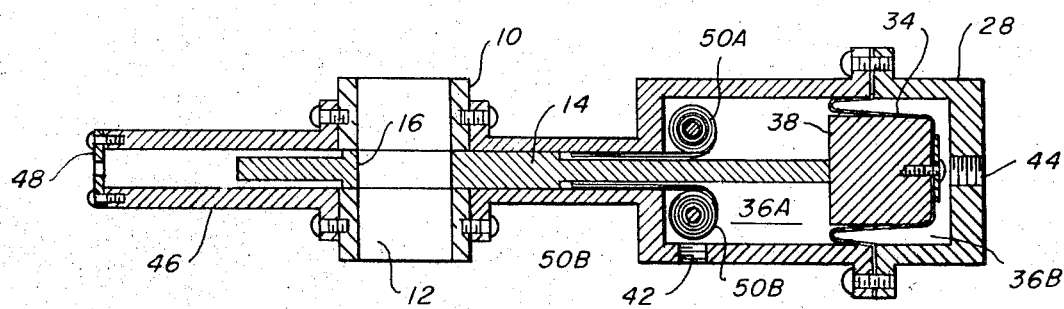
FIG. 2 is a cross-sectional view of an alternate embodiment of the valve of this invention.

FIG. 2 shows an alternate embodiment of FIG. 1. The valve functions the same as previously described except that springs 50A and 50B are located on the same side of valve body 10 as the diaphragm 34. The force of springs 50A and 50B tends to pull the valve closure member 14 in the direction towards the diaphragm 34. The same pressure ratios (assuming the same working cross-sectional area of diaphragm 34 in the arrangement of FIG. 2 as in FIG. 1) function to close the valve as long as the tension force of springs 50A and 50B is the same, except that the higher pressure must be applied at port 44 in FIG. 2 while in FIG. 1 higher pressure must be applied at port 42.

Figure 3:
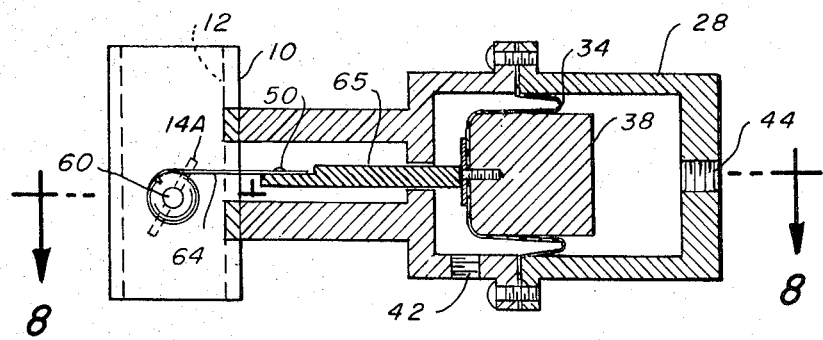
FIG. 3 is a cross-sectional view of an additional alternate embodiment of the valve of this invention including the use of a butterfly-type valve.
Figure 4:
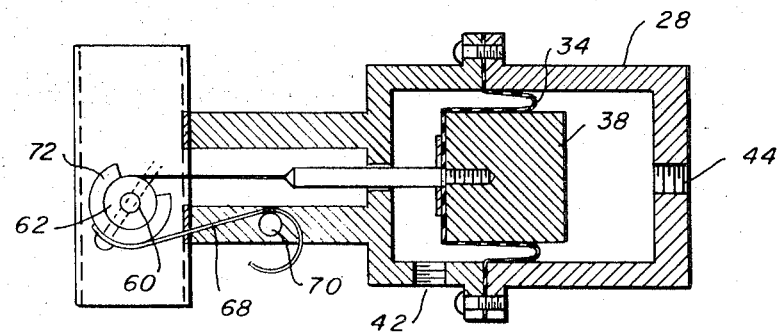
FIG. 4 is a cross-sectional view of a different embodiment of the valve of FIG. 3.
Figure 8:
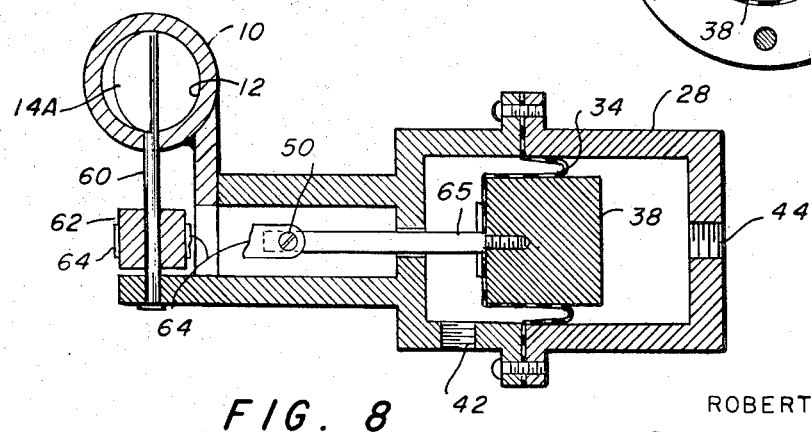
FIG. 8 is a cross-sectional view taken along the line 8—8 of FIG. 3.

FIGS. 3, 4 and 8 show an alternate embodiment of the invention in which a butterfly type valve is utilized. Referring particularly to FIGS. 3 and 8 the valve body 10 includes a fluid passageway 12 as previously described. Positioned in the passageway is a closure member 14A in the form of a circular disc, the closure member being supported on one end of a shaft 60 which rotatably is received by and extends through the side of valve body 10. On the other end of shaft 60 is a spring drum 62. Attached to the outer circumference of spring drum 62 is a constant tension spring 64. One end of the spring 64 is affixed to the spring drum 62 and the other end is affixed by such means as a screw 50 to shaft 65 extending from piston 38. The embodiment of FIGS. 3 and 8 functions as previously described with reference to the embodiments of FIGS. 1 and 2 except that movement of piston 38, in response to the differential pressure applied to port openings 42 and 44, rotates shaft 60 by the linear displacement of spring 64.

FIG. 4 functions as described with reference to embodiment of FIGS. 8 and 8 except that the drum 62, which is attached to shaft 60, has a tension member 61 such as a cable wrapped around and extending therefrom and affixed to the piston shaft 65. The inactive end of the constant tension spring 68 is received around and affixed to a spring quadrant 72 which is affixed to the shaft 60. The other end of the spring 68 forms a natural state coil about a pin 70 which may be rotatably supported.

It can be seen that the null-balance regulator control valve as described herein satisfies all of the requirements previously set forth for the invention. While the invention has been described with a certain degree of particularity it is manifest that many changes may be made in the details of construction and arrangement of components without departing from the spirit and scope of the invention. It is understood that the invention is not limited to the exemplified embodiment set forth herein but is limited only by the scope of the attached claim or claims, including the full range of equivalency to which each element or step thereof is entitled.

I claim:

1. A null-balance valve for regulation of fluid flow comprising:

a valve body having a fluid passageway therethrough;

a plate slidably received in said valve body, the plate having an opening therein whereby in the opened position the opening is aligned with the fluid passageway in the valve body permitting fluid flow therethrough and in the closed position the closure plate blocks fluid flow through the valve body;

a cylinder supported to the valve body and having a first fluid port adjacent one end thereof and a secon fluid port adjacent the other end thereof;

a rolling diaphragm piston in said cylinder intermediate said ports, the piston being attached to said plate for positioning the plate, the force applied by said piston to the movement of said plate being equal to the difference in pressure at said first and second ports times the working area of said piston; and constant tension means normally urging said plate towards said opened or closed position, the direction of movement of the plate being determined by the force applied by said constant tension means versus the force applied by said piston, the force required to move said plate towards said opened or closed position as applied by said piston being substantially constant at all positions of said plate.

* * * * *